A. C. BARNES.
METHOD OF SECURING TIRES ON WHEELS.

No. 62,593. Patented Mar. 5, 1867

Witnesses.

Inventor.

United States Patent Office.

ANDREW C. BARNES, OF ALBIA, IOWA.

Letters Patent No. 62,593, dated March 5, 1867.

IMPROVEMENT IN THE METHOD OF SECURING TIRES ON WHEELS

The Schedule referred to in these Letters Patent and making part of the same.

TO ALL WHOM IT MAY CONCERN:

Be it known that I, ANDREW C. BARNES, of Albia, Monroe county, State of Iowa, have invented a new and improved Mode for Securing Tires on the Wheels of Vehicles; and I do hereby declare that the following is a full, clear, and exact description thereof, which will enable others skilled in the art to make and use the same, reference being had to the accompanying drawing, forming part of this specification, in which—

Figure 1:
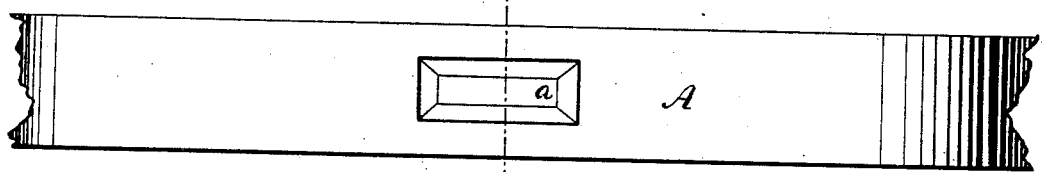
Figure 1 is an inner view of a portion of a tire of a wheel, showing part of my invention.
Figure 2:
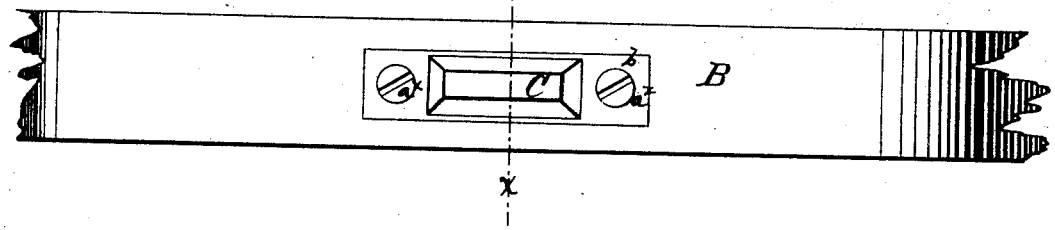
Figure 2 is an outer or face view of a portion of a felloe of a wheel with a part of my invention applied to it.
Figure 3:
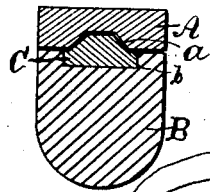

Figure 3, a transverse section of the piece of felloe and tire when adjointed together, taken in the line $x\,x$, figs. 1 and 2.

Similar letters of reference indicate like parts.

This invention relates to an improved manner of securing tires on wheels without the aid of the bolts usually employed for that purpose. The invention consists in having the inner surface of the tire indented or grooved at suitable distances apart to receive metal projectors or lugs, which are secured to the outer or face side of the felloes of the wheel, the tire, when expanded by heat, being capable of being fitted over said lugs or projections, and as it cools, gradually shrinking, so as to fit snugly upon the felloes, with the lugs or projections fitting in the tire.

A, fig. 1, represents a portion of the tire of a wheel having an indentation or groove, $a$, made in it. Any suitable number of these indentations or grooves may be made in the tire at equal distances apart, and extending all around it. B represents a portion of the felloe of a wheel, and C a metal lug or projection, secured to it. This lug or projection is formed with a base, $b$, which projects beyond its ends sufficiently far to admit of holes being made in it for screws $a^x$ to pass through into the felloe and secure the lug or projection to the felloe; the base $b$ being fitted in a recess in the felloe so that the outer surface of the base will be flush with the outer surface of the felloe. The lugs or projections C are of a size corresponding to the indentations or grooves $a$ in the inner surface of the tire, and the lugs or projections are secured on the felloes at points to correspond with the indentations or grooves in the side. The tire is expanded by heating it, and when thus expanded will be capable of being fitted around the wheel over the lugs or projections, and as the tire cools and contracts it gradually fits to the wheel, the lugs or projections C fitting in the indentations or grooves $a$, (see fig. 3;) and effectually securing the tire on the wheel. By this means the tire cannot become detached from the wheel; and the felloes will not, as hitherto, be weakened by bolt holes.

Having thus described my invention, I claim as new, and desire to secure by Letters Patent—

The combination of the lug C, and felloe B, as described, operating correspondingly with the groove $a$ in he tire A, in the manner substantially as and for the purpose specified.

The above specification of my invention signed by me this 13th day of January, 1866.

ANDREW C. BARNES.

Witnesses:
M. L. SWENEY,
H. HICKENLOOPER.